United States Patent
Chang et al.

(10) Patent No.: US 10,642,095 B2
(45) Date of Patent: May 5, 2020

(54) BACKLIGHT MODULE AND DISPLAY DEVICE CONTAINING THE SAME

(71) Applicant: InnoLux Corporation, Miao-Li County (TW)

(72) Inventors: Shun-Yu Chang, Miao-Li County (TW); Siow-Mean Loh, Miao-Li County (TW); Ying-Chieh Tsai, Miao-Li County (TW); Ming-Chia Shih, Miao-Li County (TW)

(73) Assignee: INNOLUX CORPORATION, Mao-Li County (TW)

( * ) Notice: Subject to any disclaimer, the term of this patent is extended or adjusted under 35 U.S.C. 154(b) by 160 days.

(21) Appl. No.: 15/826,807

(22) Filed: Nov. 30, 2017

(65) Prior Publication Data

US 2018/0157116 A1    Jun. 7, 2018

(30) Foreign Application Priority Data

Dec. 7, 2016 (CN) .......................... 2016 1 1114314

(51) Int. Cl.
*G02F 1/1335* (2006.01)
*G02F 1/13357* (2006.01)
*F21V 8/00* (2006.01)

(52) U.S. Cl.
CPC ..... *G02F 1/133602* (2013.01); *G02B 6/0016* (2013.01); *G02B 6/0055* (2013.01); *G02F 1/133553* (2013.01); *G02F 1/133615* (2013.01)

(58) Field of Classification Search
USPC ....................................... 362/97.1
See application file for complete search history.

(56) References Cited

U.S. PATENT DOCUMENTS

| | | | | |
|---|---|---|---|---|
| 2008/0119583 | A1* | 5/2008 | Jones | B82Y 30/00 522/113 |
| 2008/0253148 | A1* | 10/2008 | Jones | B82Y 30/00 362/608 |
| 2010/0214805 | A1* | 8/2010 | Cheng | G02B 5/045 362/627 |

FOREIGN PATENT DOCUMENTS

| | | |
|---|---|---|
| CN | 1377453 A | 10/2002 |
| CN | 1504804 A | 6/2004 |
| CN | 101684927 A | 3/2010 |
| CN | 105182613 A | 12/2015 |

OTHER PUBLICATIONS

Office Action dated Feb. 3, 2020 in corresponding Chinese application No. 2016 11114314.X.

* cited by examiner

*Primary Examiner* — Michael G Lee
*Assistant Examiner* — David Tardif
(74) *Attorney, Agent, or Firm* — Bacon & Thomas, PLLC

(57) ABSTRACT

A backlight module and a display device are disclosed. The display device includes: a reflective plate; a light guide plate disposed on the reflective plate; a turning film disposed on the light guide plate, wherein the turning film comprises a plurality of grooves on a surface thereof facing to the light guide plate; an optical film disposed on the turning film; a display panel disposed on the optical film; and a micro-structure film disposed on the optical film, wherein the display panel and the micro-structure film are arranged in a stack, the micro-structure film includes a first layer and a second layer, and an interface between the first layer and the second layer is formed of a multi-curve structure.

14 Claims, 7 Drawing Sheets

BACKLIGHT MODULE AND DISPLAY DEVICE CONTAINING THE SAME

CROSS REFERENCE TO RELATED APPLICATION

This application claims the benefits of the Chinese Patent Application Serial Number 201611114314.X, filed on Dec. 7, 2016, the subject matter of which is incorporated herein by reference.

BACKGROUND

1. Field

The present disclosure relates to a backlight module and a display device containing the same, and more particularly to a backlight module and an in-car display device that conforms to industrial specifications in effect or has improved brightness.

2. Description of Related Art

An in-car display device acts as a hub for in-vehicle information display and interaction. It is configured to display informative images, multimedia images, real-time road images, and any combinations thereof, among others. As a car is a device for transportation, an in-car display device used therein has regulations to follow in terms of visual angle and. brightness thereof.

An existing in-car display device typically has its right and left visual angles wider than its upper and lower visual angles. Currently the industrial specifications define three zones for in-car displays, namely Zone A+, Zone A and Zone B, hereinafter collectively referred to as the specification zones. Therein, Zone A+ has a lower visual angle of 4 degrees, an upper visual angle of 8 degrees, and right and left visual angles each of 10 degrees; Zone A has a lower visual angle of 10 degrees, an upper visual angle of 20 degrees, right and left visual angles each of 40 degrees; and Zone B has a lower visual angle of 10 degrees, an upper visual angle of 20 degrees, and right and left visual angles each of 50 degrees. Additionally, in terms of brightness, Zone A+ must be 600 $cd/m^2$ or more; Zone A must be at least 56% of Zone A+; and Zone B must be at least 38% of Zone A+.

While most commercially available in-car display devices are conformable to the industrial specifications, there is a trend that these specifications evolve almost every year. For manufacturers to increase brightness of existing in-car display devices, it is necessary to increase power output.

In view of this, there is a need for an in-car display device that is adapted to industrial specifications for in-car display devices by improving its overall screen brightness without changing its original power output.

SUMMARY

The primary of the present disclosure is to provide a backlight module and a display device containing the same, and more particularly a backlight module and an in-car display device containing the same, which meets industrial specifications for upper, lower, right and left visual angles and improves screen brightness in the mandatory specification zones without increasing power output.

According to the present disclosure, a display device comprises: a reflective plate; a light guide plate disposed on the reflective plate; a turning film disposed on the light guide plate, wherein the turning film comprises a plurality of grooves on a surface thereof facing to the light guide plate; an optical film disposed on the turning film; a display panel disposed on the optical film; and a micro-structure film disposed on the optical film, wherein the display panel and the micro-structure film are arranged in a stack, the micro-structure film comprises a first layer and a second layer, and an interface between the first layer and the second layer is formed of a multi-curve structure.

According to the present disclosure, the backlight module comprises: a reflective plate; a light guide plate disposed on the reflective plate; a turning film disposed on the light guide plate, wherein the turning film comprises a plurality of grooves on a surface thereof facing to the light guide plate; an optical film disposed on the turning film; and a micro-structure film disposed on the optical film, wherein the micro-structure film comprises a first layer and a second layer, and an interface between the first layer and the second layer is formed of a multi-curve structure.

As discussed above, the disclosed backlight module and display device use the reflective plate, the light guide plate, the turning film, and the optical film to shape a more focused, collimated light pattern. Additionally, with the micro-structure film having the multi-curve structure, the disclosed display device has improved screen brightness in the specification zones without increasing power output of the existing in-car backlight module.

Other objects, advantages, and novel features of the disclosure will become more apparent from the following detailed description when taken in conjunction with the accompanying drawings.

DETAILED DESCRIPTION OF THE EMBODIMENT

For further illustrating the means and functions by which the present disclosure achieves the certain objectives, the following description, in conjunction with the accompanying drawings and embodiments, is set forth as below to illustrate the implement, structure, features and effects of the subject matter of the present disclosure.

Furthermore, throughout the specification and claims provided herein, ordinal numbers such as "first," "second," "third" and so on when used with elements are for describing the relevant elements, and by no means express or imply that there is any preceding ordinal number related to the relevant elements. When two or more such ordinal numbers used to describe elements in sequence, there is not necessarily an order between/among the relevant elements or between/among steps of a method. The use of ordinal number is for the purpose of clear differentiation between/among claimed elements that have an identical name.

Embodiment 1

Figure 1:
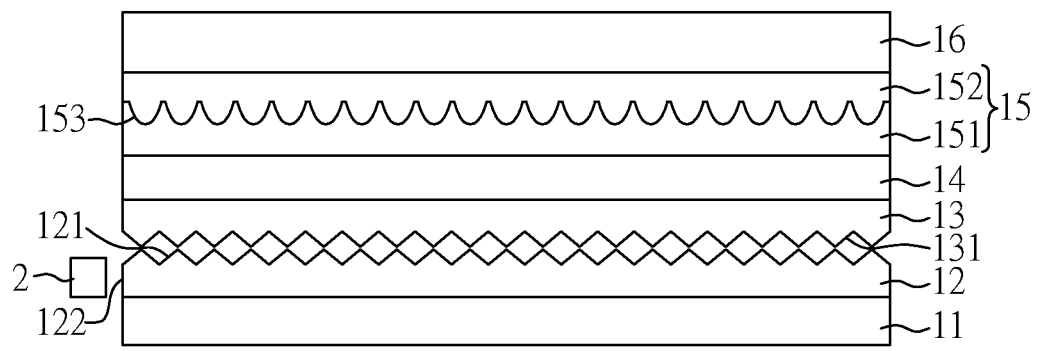
FIG. 1 is a cross-sectional view of an in-car display device according to Embodiment 1 of the present disclosure.

FIG. 1 is a cross-sectional view of an in-car display device of the present embodiment. As shown, the disclosed in-car display device comprises a backlight module, which comprises: a reflective plate 11; a light guide plate 12 disposed on reflective plate 11; a turning film 13 disposed on light guide plate 12, wherein the turning film 13 comprises a plurality of grooves 131 on a surface thereof facing to the light guide plate 12; an optical film 14 disposed on turning film 13; and a micro-structure film 15 disposed on the optical film 14, wherein the micro-structure film 15 includes a first layer 151 and a second layer 152, and an interface between the first layer 151 and the second layer 152 is formed of a multi-curve structure 153. The in-car display device of the present embodiment comprises: the aforementioned backlight module and a display panel 16 disposed on optical film 14, wherein the micro-structure film 15 is disposed between the display panel 16 and the optical film 14, and the display panel 16 and the micro-structure film 15 are arranged in a stack.

Additionally, the disclosed in-car display device further comprises: a light-emitting unit 2, disposed next to the light guide plate 12 and adjacent to a light-entering surface 122 of the light guide plate 12. In the present embodiment, by stacking the reflective plate 11, the light guide plate 12, the turning film 13, and the optical film 14 together, a more focused, collimated light pattern can be achieved.

In the present embodiment, the light-emitting unit 2 is not limited. It may be, for example, an LED unit. Also, the reflective plate 11 is not limited. It maybe, for example, a white reflective plate or a silver reflective plate. In the present embodiment, the reflective plate 11 is a silver reflective plate, for enhancing the overall brightness of the display device. Additionally, in the present embodiment, the light guide plate 12 may comprise a plurality of V-shaped micro-grooves 121. Therein, the V-shaped micro-grooves 121 may be disposed on the surface of the light guide plate 12 facing to the reflective plate 11, the surface of the light guide plate 12 facing to the display panel 16 and facing to the optical film 14, or both of the above. In the present embodiment, the V-shaped micro-grooves 121 are disposed on the surface of the light guide plate 12 facing to the display panel 16 and facing to the optical film 14. Furthermore, in the present embodiment, the grooves 131 on the turning film 13 may be V-shaped micro-grooves. The optical film 14 may be a dual brightness enhancement film (DBEF). The display panel 16 may be a liquid crystal display panel.

Embodiment 2

Figure 2:
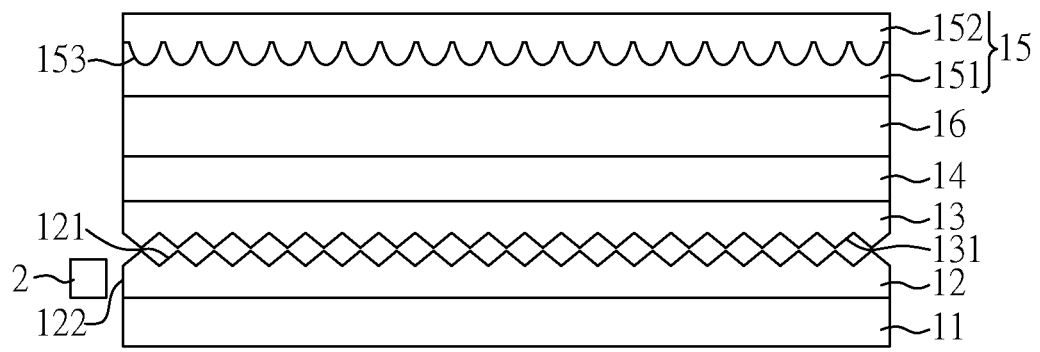
FIG. 2 is a cross-sectional view of an in-car display device according to Embodiment 2 of the present disclosure.

FIG. 2 is a cross-sectional view of an in-car display device according to the present embodiment. In the present embodiment, the in-car display device is similar to its counterparts as described in Embodiment 1, except that the micro-structure film 15 is located differently. In the present embodiment, the micro-structure film 15 is disposed on the display panel 16.

Figure 3:
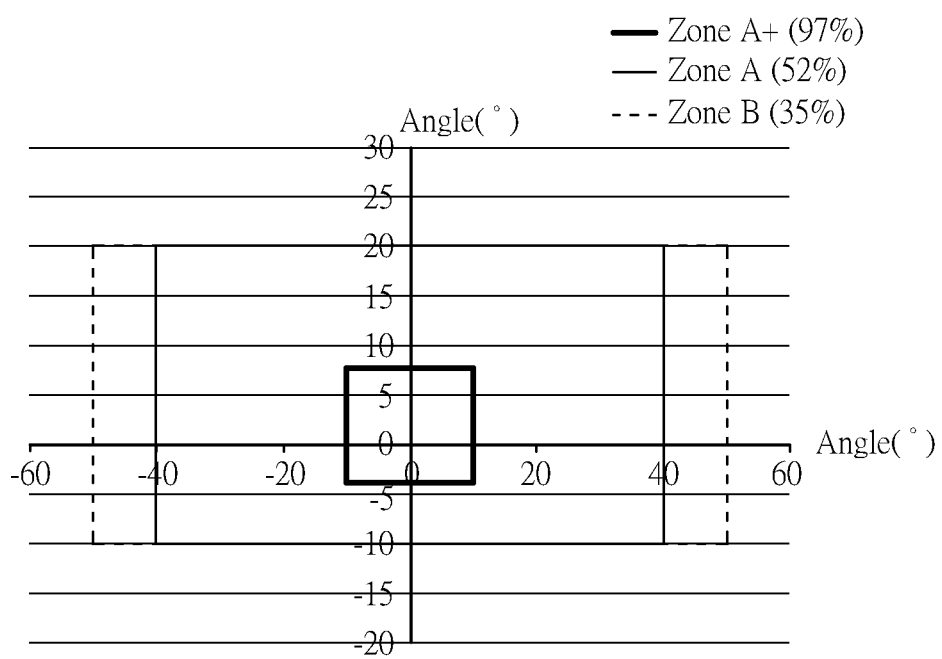
FIG. 3 is a schematic view of the in-car display device showing its upper, lower, right and left visual angles and specification zones.

In each of Embodiment 1 and Embodiment 2 as discussed previously, the display device uses a micro-structure film that has a multi-curve structure, so it can meet the requirements for the specification zones of an in-car display device and improve screen brightness in the specification zones without increasing the power output of its existing in-car backlight module. In the present disclosure, the in-car display device of any of Embodiment 1 or Embodiment 2 has its visual angles meets the requirements for the upper, lower, right and left visual angles and specification zones as shown in FIG. 3. Presently, the mandatory specification zones are Zone A+, Zone A, and Zone B. Therein, Zone A+ is a zone having a lower visual angle of 4 degrees, an upper visual angle of 8 degrees, and right and left visual angles each of 10 degrees. Zone A is a zone having a lower visual angle of 10 degrees, an upper visual angle of 20 degrees, and right and left visual angles each of 40 degrees. Zone B is a zone having a lower visual angle of 10 degrees, an upper visual angle of 20 degrees, right and left visual angles each of 50 degrees. It is clear that the upper and lower visual angles are asymmetric, and that the right and left visual angles require a wider light pattern. Additionally, in terms of brightness, Zone A+ must be 600 cd/m$^2$ or more, Zone A must be at least 56% of Zone A+, and Zone B must be at least 38% of Zone A+. In the disclosed in-car display device, the size of the display panel is determined by the visual angles and brightness levels of Zone A+, Zone A and Zone B as described previously.

As shown in FIG. 1 and FIG. 2, the display devices of Embodiment 1 and Embodiment 2 may use the micro-structure films 15 structurally identical or different. Herein, two aspects of the micro-structure film 15 suitable for the purpose of the present disclosure is provided.

Figure 4A:
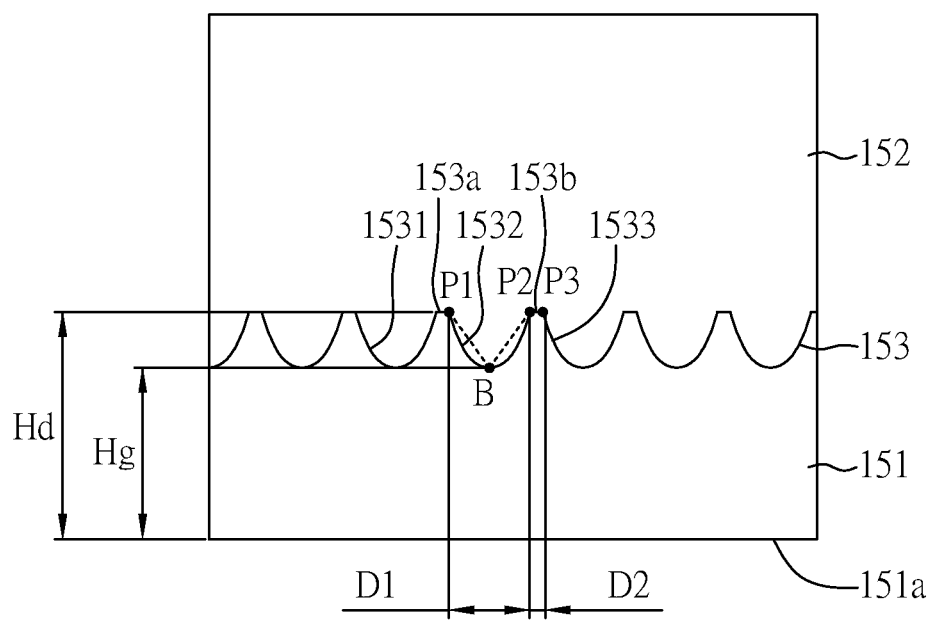
FIG. 4A is a cross-sectional view of a micro-structure film according to one aspect of the present disclosure.
Figure 4B:
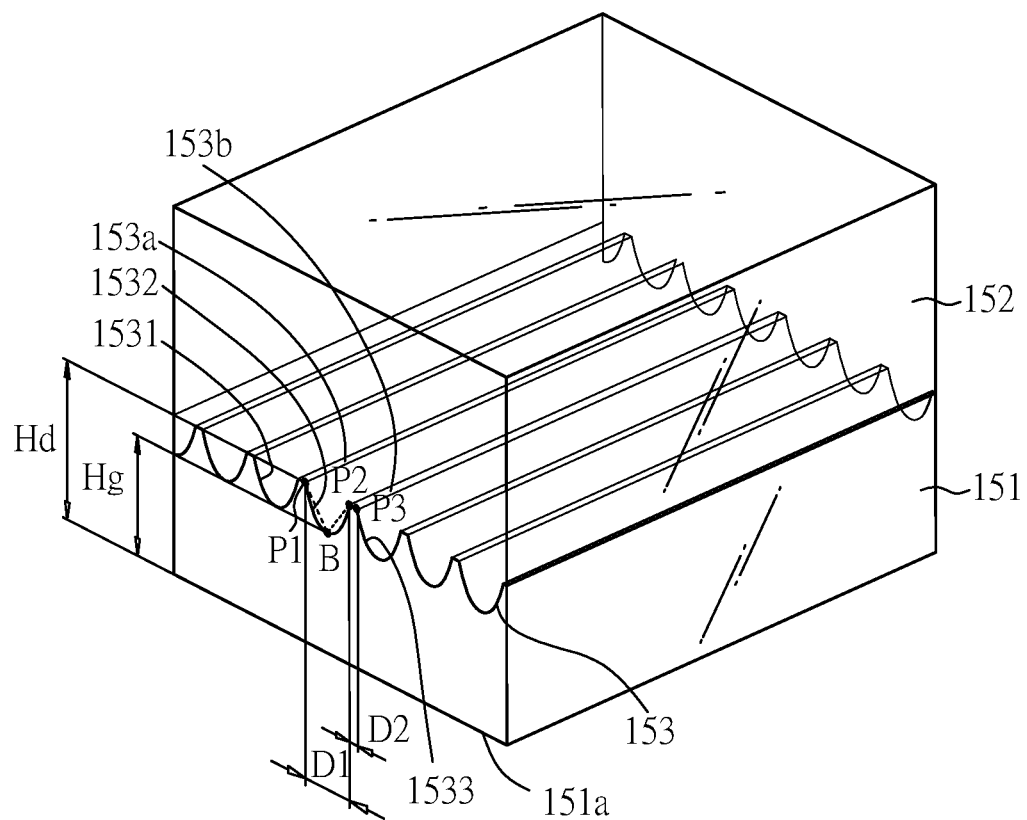
FIG. 4B is a perspective view of the micro-structure film according to one aspect of the present disclosure.

FIG. 4A and FIG. 4B area cross-sectional view and a perspective view of the micro-structure film according to a first aspect of the present disclosure. Therein, as shown in FIG. 1, FIG. 4A and FIG. 4B, the micro-structure film 15 has a first layer 151, a second layer 152, and the interface between the first layer 151 and the second layer 152 is formed of the multi-curve structure 153. Therein, the first layer 151 of the micro-structure film 15 is located between the second layer 152 of the micro-structure film 15 and the optical film 14. Additionally, the first layer 151 may be made of a material having a refractive index between 1.1 and 1.5, such as a material having a refractive index of 1.3. Furthermore, the second layer 152 may be made of a material having a refractive index between 1.4 and 1.65, such as PMMA or PET, yet the present disclosure is not limited thereto.

As shown in FIG. 1, FIG. 4A, and FIG. 4B, the multi-curve structure 153 comprises a plurality of concaves (i.e. a first concave 1531, a second concave 1532, and a third concave 1533), and the concaves face to the display panel 16 while facing away from the optical film 14. As shown in FIG. 2, FIG. 4A and FIG. 4B, the concaves face away from the optical film 14. The present disclosure puts no limitations in terms of curvature radius to the concaves of the multi-curve structure 153, and the requirement is that these concaves shall provide curved profiles. Additionally, as shown in FIG. 4A and FIG. 4B, the concaves include a first concave 1531, a second concave 1532, and a third concave 1533. The second concave 1532 is located between the first concave 1531 and the third concave 1533. The first concave 1531 is adjacent to and connected to the second concave 1532 via a first flat 153a (i.e. a first surface), and the second concave 1532 is adjacent to and connected to the third concave 1533 via a second flat 153b (i.e. a second surface).

Figure 5:
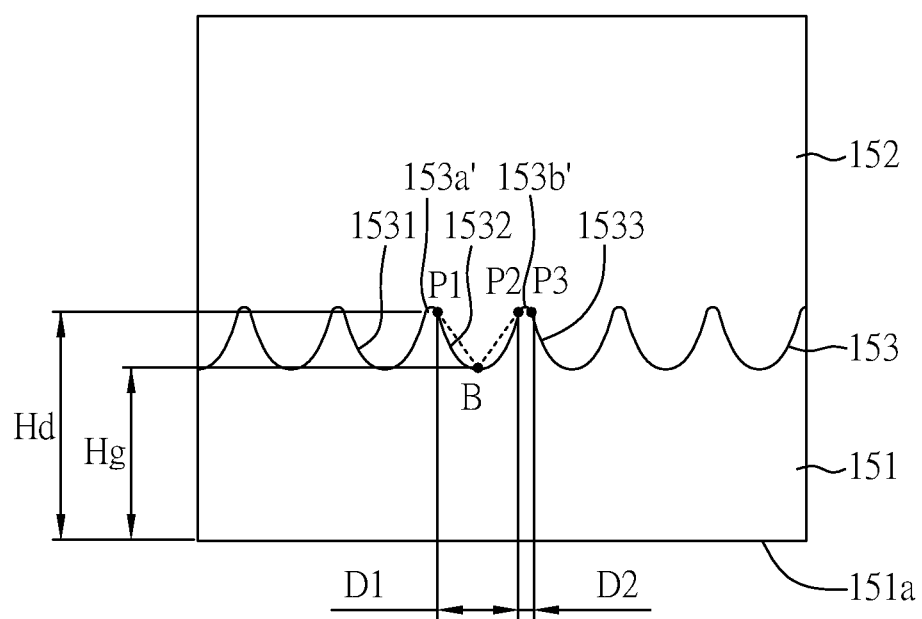
FIG. 5 is a cross-sectional view of a micro-structure film according to another aspect of the present disclosure.

FIG. 5 is a cross-sectional view of a micro-structure film according to another aspect of the present disclosure. The micro-structure film shown here is structurally similar to that in FIG. 4A, except that the first concave 1531 is adjacent to and connected to the second concave 1532 via a first convex 153a' (i.e. a first surface), and the second concave 1532 is adjacent to and connected to the third concave 1533 via a second convex 153b' instead (i.e. a second surface).

The concave as referred to in the present disclosure is herein defined with reference to the second concave. As shown in FIG. 4A, FIG. 4B or FIG. 5, there is a first turning point P1 between the first flat 153a or the first convex 153a' and the second concave 1532, and there is a second turning point P2 between the second flat 153b or the second convex 153b' and the second concave 1532, so that with the bottommost point of the second concave 1532 taken as a benchmark B, the surface of the second concave 1532 is located at the outside of the link between the first turning point P1 and the benchmark B (as indicated by the dotted line) and also located at the outside of the link between the second turning point P2 and the benchmark B (as indicated by the dotted line).

For improving the light pattern and brightness, in the micro-structure film, the distance D1 between the first turning point P1 and the second turning point P2 may be greater than or equal to 40 µm and less than or equal to 60 µm (40 µm≤D1≤60 µm). Additionally, there is a third turning point P3 between the second flat 153b and the third concave 1533, and the distance D2 between the second turning point P2 and the third turning point P3 may be greater than or equal to 3 µm and less than or equal to 7 µm (3 µm≤D2≤7 µm).

Furthermore, as shown in FIG. 1, FIG. 2 and FIG. 4A to FIG. 7, the first layer 151 is located between the second layer 152 and the optical film 14, the first layer 151 comprises a surface 151a away from the interface between the first layer 151 and the second layer 152, the distance Hg between a vertex of one of the concaves (for example, the benchmark B) and the surface 151a of the first layer 151 may be greater than or equal to 80 µm and less than or equal to 210 µm (80 µm≤Hg≤210 µm). In another embodiment, the distance Hg may be greater than or equal to 80 µm and less than or equal to 150 µm (80 µm≤Hg≤150 µm). In further another embodiment, the distance Hg may be greater than or equal to 80 µm and less than or equal to 120 µm (80 µm≤Hg≤120 µm). The distance Hd between the surface 151a of the first layer 151 and one of the first turning point P1, the second turning point P2 and the third turning point P3 may be greater than or equal to 90 µm and less than or equal to 210 µm (90 µm≤Hd≤210 µm). In another embodiment, the distance Hd may be greater than or equal to 100 µm and less than or equal to 180 µm (100 µm≤Hd≤180 µm). In further another embodiment, the distance Hd may be greater than or equal to 130 µm and less than or equal to 170 µm (130 µm≤Hd≤170 µm).

Additionally, as shown in FIG. 4A, FIG. 4B and FIG. 5, the concaves (i.e. the first concave 1531, the second concave 1532, and the third concave 1533) of the micro-structure film form a rib-like structure. The orientation relation between this rib-like structure and the grooves 131 of the turning film 13 or the V-shaped micro-grooves 121 of the light guide plate 12 is not something to be limited in the present disclosure. In some embodiments, the orientation relation between the rib-like structure of the micro-structure film and the grooves 131 of the turning film 13 or the V-shaped micro-grooves 121 of the light guide plate 12 may be adjusted to minimize ripples in the resulting display panel. Herein, the term "orientation relation" refers to the relationship between the extending direction of the rib-like structure and the extending direction of the grooves 131 or of the V-shaped micro-grooves 121.

Furthermore, while not shown in FIG. 1, in other embodiments of the present disclosure, the micro-structure film 15 and the optical film 14 are not necessarily completely attached to each other, and in this case, there may be a layer of air between them. Similarly, while not shown in FIG. 2, in other embodiments of the present disclosure, the micro-structure film 15 and the display panel 16 are not necessarily completely attached to each other, and in this case, there may be a layer of air between them.

TEST EXAMPLE 1

Figure 6:
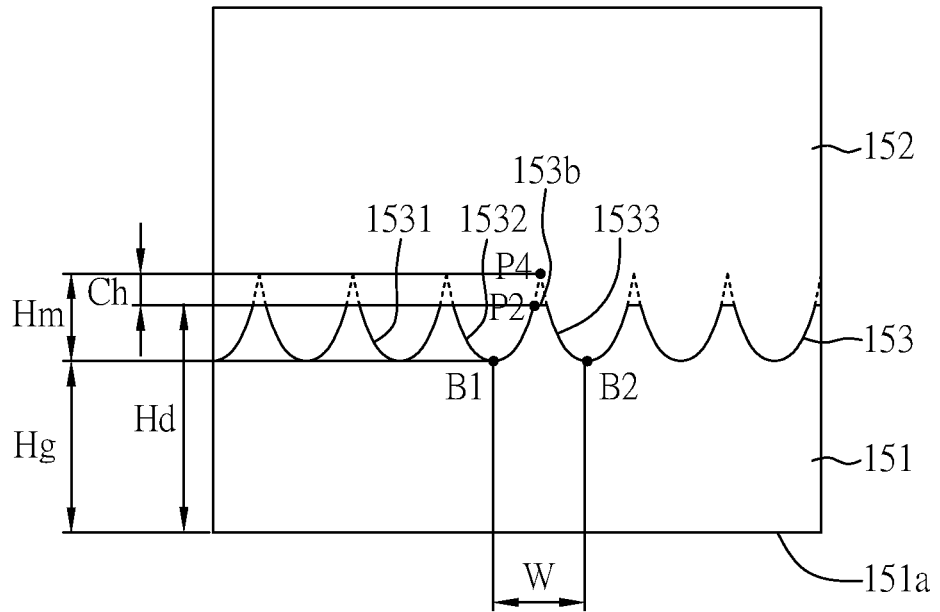
FIG. 6 illustrates parameters used in the micro-structure film for simulating the light pattern in the Test Example 1 of the present disclosure.

The present test example is for light pattern simulation and was run using the in-car display device of FIG. 1 in conjunction with the micro-structure film of FIG. 6 (a micro-structure film structurally similar to those shown in FIG. 4A and FIG. 4B). As shown in FIG. 1, the reflective plate 11 is a silver reflective plate, and the light guide plate 12 has V-shaped micro-grooves 121, while the turning film 13 also has V-shaped micro-grooves. The optical film 14 may be a dual brightness enhancement film. The display panel 16 may be a liquid crystal display panel. The first layer 151 of the micro-structure film 15 is made of a material having a refractive index of 1.3, and the second layer 152 is made of PMMA.

As shown in FIG. 6, in the present test example, the first layer 151 having an apex P4, as indicated by the dotted line, was first formed and cut into a flat (as the second flat 153b), wherein the height Ch is 20 µm. The vertical distance Hm between the apex P4 and the bottommost point B1 of the second concave 1532 is 70 µm. The distance Hd between the second turning point P2 and the surface 151a of the first layer 151 is 150 µm. The distance Hg between the bottommost point B1 of the second concave 1532 and the surface 151a of the first layer 151 is 100 µm. The distance W between the bottommost point B1 of the second concave 1532 and the bottommost point B2 of the third concave 1533 is 50 µm. As shown in FIG. 4A, the distance D1 between the first turning point P1 and the second turning point P2 may be 45 µm. Also as shown in FIG. 4A, the distance D2 between the second turning point P2 and the third turning point P3 may be 5 µm.

TEST EXAMPLE 2

Figure 7:
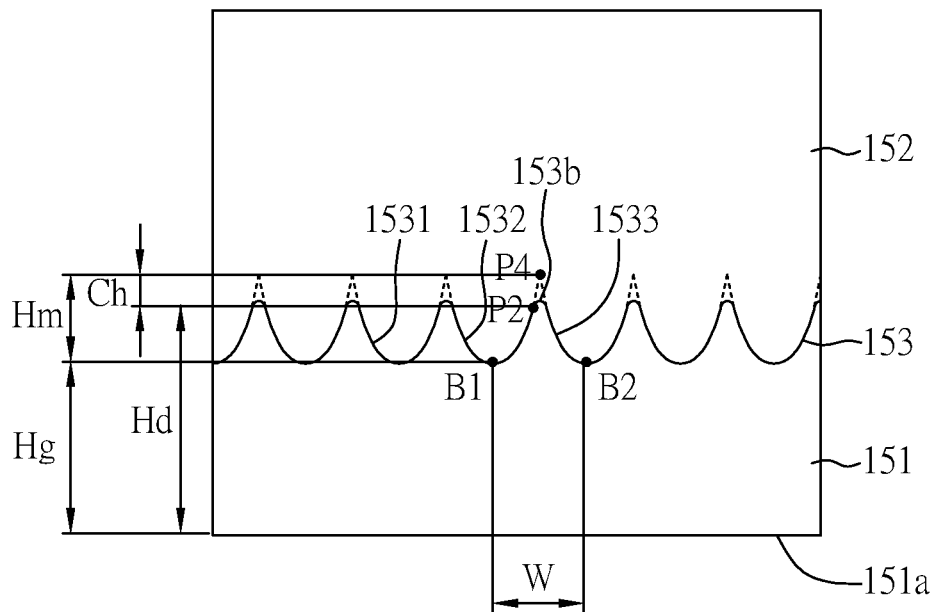
FIG. 7 illustrates parameters used in the micro-structure film for simulating the light pattern in the Test Example 2 of the present disclosure.

The present test example used test conditions similar to those for Test Example 1, and also used the in-car display device as shown in FIG. 1. The difference is that the present test example performed light pattern. simulation using the micro-structure film as shown in FIG. 7 (structurally identical to the micro-structure film of FIG. 5). Therein, the various parameters for the micro-structure film, such as the distance D1, the distance D2, the height Ch, the vertical distance Hm, the distance Hd, the distance Hg and the distance W) are all identical to those for Test Example 1.

The simulative results from Test Examples 1 and 2 indicate that the disclosed in-car display device is capable of providing a more focused light pattern, and the light patterns from Test Examples 1 and 2 are of no significant difference.

Comparative Example

Figure 8:
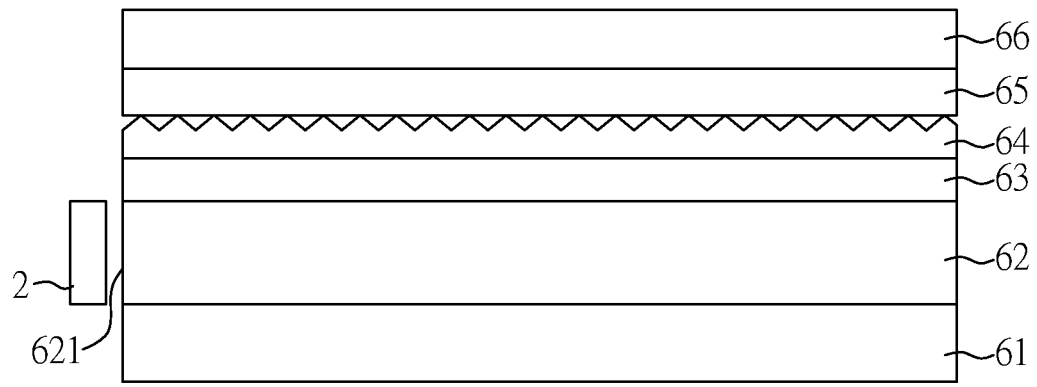
FIG. 8 is a cross-sectional view of an in-car display device according to a comparative example of the present disclosure.

FIG. 8 is a cross-sectional view of an in-car display device according to a comparative example of the present disclosure. Therein, a light guide plate 62, a diffusion plate 63, a prism sheet 64, a dual brightness enhancement film 65 and a display panel 66 are stacked on the reflective plate 61 successively, and a light-emitting unit 2 is placed next to the light-entering surface 621 of the light guide plate 62. The in-car display device of Comparative Example uses the diffusion plate 63 to haze and diffuse light, and then uses the prism sheet 64 to focus light unidirectionally At last, the dual brightness enhancement film 65 serves to haze light and enhance brightness, thereby endowing the in-car display device with its desired performance.

Figure 9:
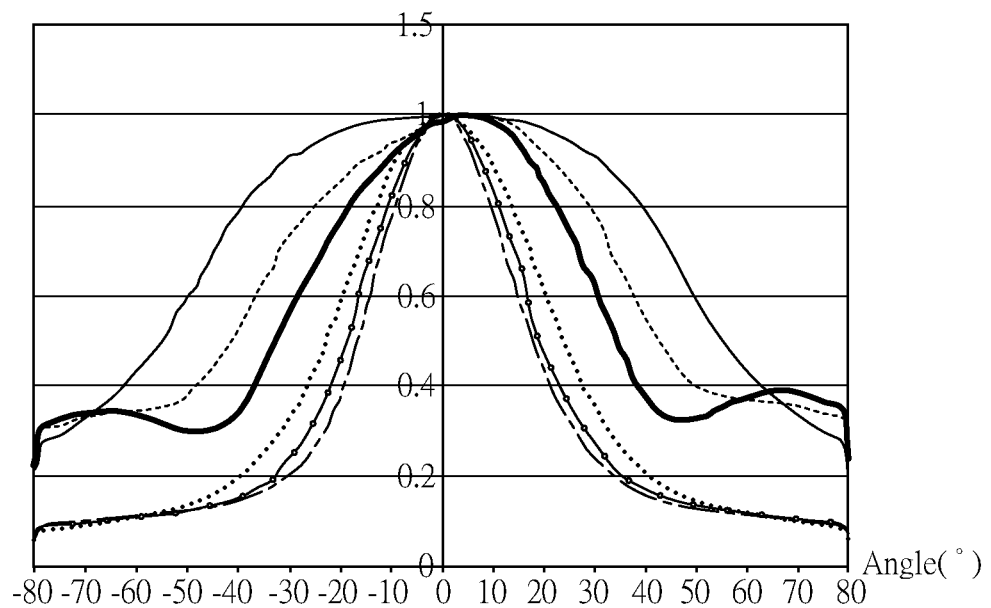
FIG. 9 shows normalized light patterns of the in-car display devices of Test Example 1 and of Comparative Example of the present disclosure.

FIG. 9 shows normalized light patterns of the in-car display devices of Test Example 1 and of Comparative Example of the present disclosure. Therein, the light-emitting unit and the display panel used in Test Example 1 and in Comparative Example are identical. By normalizing the light patterns obtained from Test Example 1 and from Comparative Example, the results can be summarized as shown in FIG. 9. Therein, the light pattern of the in-car display device of Test Example 1 is more focused than the light pattern of the in-car display device of Comparative Example from any of the visual angles. Additionally, by analyzing the light patterns obtained from Test Example 1 and Comparative Example, it is found that the in-car display device of Test Example 1 provides at least a 10% gain in brightness with respect to the in-car display device of Comparative Example.

As can be learned from the foregoing results, the disclosed in-car display device, by incorporating the reflective plate, the light guide plate, the turning film, and the optical film, achieves its purpose of providing a more focused, collimated light pattern. Moreover, with the micro-structure film having the multi-curve structure, the disclosed in-car display device can further improve screen brightness in the specification zone. The present disclosure thus addresses the increasingly evolved specifications in terms of brightness in the specification zone.

The present disclosure has been described with reference to the embodiments and it is understood that the embodiments are not intended to limit the scope of the present disclosure. Moreover, as the contents disclosed herein should be readily understood and can be implemented by a person skilled in the art, all equivalent changes or modifications which do not depart from the concept of the present disclosure should be encompassed by the appended claims.

Although the present disclosure has been explained in relation to its embodiment, it is to be understood that many other possible modifications and variations can be made without departing from the spirit and scope of the disclosure as hereinafter claimed.

What is claimed is:

1. A display device, comprising:
   a reflective plate;
   a light guide plate disposed on the reflective plate;
   a turning film disposed on the light guide plate, wherein the turning film comprises a plurality of grooves on a surface thereof facing to the light guide plate;
   an optical film disposed on the turning film;
   a display panel disposed on the optical film; and
   a micro-structure film disposed on the optical film, wherein the display panel and the micro-structure film are arranged in a stack, the micro-structure film comprises a first layer and a second layer, and an interface between the first layer and the second layer is formed of a multi-curve structure;
   wherein the multi-curve structure comprises a plurality of concaves that are facing away from the optical film; the concaves includes a first concave, a second concave, and a third concave, the second concave is located between the first concave and the third concave, the first concave is connected to the second concave via a first surface, the second concave is connected to the third concave via a second surface, in which there is a first turning point between the first surface and the second concave, and there is a second turning point between the second surface and the second concave; and a distance between the first turning point and the second turning point is greater than or equal to 40 μm and less than or equal to 60 μm.

2. The display device of claim 1, wherein the light guide plate comprises a plurality of V-shaped micro-grooves.

3. The display device of claim 2, wherein the V-shaped micro-grooves are disposed on a surface of the light guide plate facing to the optical film.

4. The display device of claim 1, wherein there is a third turning point between the second surface and the third concave, and a distance between the second turning point and the third turning point is greater than or equal to 3 μm and less than or equal to 7 μm.

5. The display device of claim 1, wherein the first layer is located between the second layer and the optical film, the first layer comprises a surface away from the interface, and a distance between a vertex of one of the concaves and the surface of the first layer is greater than or equal to 80 μm and less than or equal to 210 μm.

6. The display device of claim 1, wherein the first layer is located between the second layer and the optical film, the first layer comprises a surface away from the interface, and a distance between the surface of the first layer and one of the first turning point and the second turning point is greater than or equal to 90 μm and less than or equal to 210 μm.

7. The display device of claim 1, wherein the first layer is located between the second layer and the optical film, and the first layer has a refractive index ranging from 1.1 to 1.5.

8. A backlight module, comprising:
   a reflective plate;
   a light guide plate disposed on the reflective plate;
   a turning film disposed on the light guide plate, wherein the turning film comprises a plurality of grooves on a surface thereof facing to the light guide plate;
   an optical film disposed on the turning film; and
   a micro-structure film disposed on the optical film, wherein the micro-structure film comprises a first layer and a second layer, and an interface between the first layer and the second layer is formed of a multi-curve structure;
   wherein the multi-curve structure comprises a plurality of concaves that are facing away from the optical film; the concaves includes a first concave, a second concave, and a third concave, the second concave is located between the first concave and the third concave, the first concave is connected to the second concave via a first surface, the second concave is connected to the third concave via a second surface, in which there is a first turning point between the first surface and the second concave, and there is a second turning point between the second surface and the second concave; and a distance between the first turning point and the second turning point is greater than or equal to 40 μm and less than or equal to 60 μm.

9. The backlight module of claim 8, wherein the light guide plate comprises a plurality of V-shaped micro-grooves.

10. The backlight module of claim 9, wherein the V-shaped micro-grooves are disposed on a surface of the light guide plate facing to the optical film.

11. The backlight module of claim 8, wherein there is a third turning point between the second surface and the third concave, and a distance between the second turning point and the third turning point is greater than or equal to 3 μm and less than or equal to 7 μm.

12. The backlight module of claim 8, wherein the first layer is located between the second layer and the optical film, the first layer comprises a surface away from the interface, and a distance between a vertex of one of the concaves and the surface of the first layer is greater than or equal to 80 μm and less than or equal to 210 μm.

13. The backlight module of claim 8, wherein the first layer is located between the second layer and the optical film, the first layer comprises a surface away from the interface, and a distance between one of the first turning point and the second turning point and the surface of the first layer is greater than or equal to 90 μm and less than or equal to 210 μm.

14. The backlight module of claim 8, wherein the first layer is located between the second layer and the optical film, and the first layer has a refractive index ranging from 1.1 to 1.5.

* * * * *